(12) United States Patent
Lelickens et al.

(10) Patent No.: US 8,705,685 B2
(45) Date of Patent: Apr. 22, 2014

(54) DEVICE FOR REMOVING SOLID PARTICLES FROM THE COOLING MEDIUM WHICH CIRCULATES IN THE PRIMARY CIRCUIT OF A NUCLEAR REACTOR

(75) Inventors: Hartmut Lelickens, Wiesenthau (DE); Reazul Huq, Offenbach/M (DE); Werner Meier, Kunreuth (DE); Jochen Heinecke, Kürten (DE)

(73) Assignee: Areva GmbH, Eralngen (DE)

( * ) Notice: Subject to any disclaimer, the term of this patent is extended or adjusted under 35 U.S.C. 154(b) by 489 days.

(21) Appl. No.: 12/355,092

(22) Filed: Jan. 16, 2009

(65) Prior Publication Data
US 2009/0225924 A1 Sep. 10, 2009

Related U.S. Application Data

(63) Continuation of application No. PCT/EP2007/006317, filed on Jul. 17, 2007.

(30) Foreign Application Priority Data

Jul. 22, 2006 (DE) .......................... 10 2006 034 001
Aug. 17, 2006 (DE) .......................... 10 2006 038 748

(51) Int. Cl.
  *G21C 19/32* (2006.01)
  *G21C 3/04* (2006.01)
  *G21C 19/00* (2006.01)
  *G21C 3/00* (2006.01)

(52) U.S. Cl.
USPC ........... 376/313; 376/308; 376/310; 376/347; 376/352; 376/361; 376/409; 376/426; 376/434; 376/438; 376/463

(58) Field of Classification Search
USPC ......... 376/347, 352, 308–316, 361, 409, 426, 376/434, 438–444, 463
See application file for complete search history.

(56) References Cited

U.S. PATENT DOCUMENTS

| 4,652,425 A | 3/1987 | Ferrari et al. |
| 5,219,517 A | 6/1993 | Nylund |

(Continued)

FOREIGN PATENT DOCUMENTS

| DE | 4326356 A1 | 11/1994 |
| EP | 0213813 A2 | 3/1987 |

(Continued)

OTHER PUBLICATIONS

International Search Report dated Dec. 4, 2007.

*Primary Examiner* — Bernarr Gregory
(74) *Attorney, Agent, or Firm* — Laurence A. Greenberg; Werner H. Stemer; Ralph E. Locher

(57) ABSTRACT

The geometric dimensions and shape of a device for removing solid particles from the cooling medium that is circulated in the primary circuit of a nuclear reactor, in particular a boiling water nuclear reactor, are such that the device can be inserted in lieu of a fuel element or fuel assembly into an empty fuel element or assembly position of the reactor core of the nuclear reactor.

14 Claims, 4 Drawing Sheets

(56) References Cited

U.S. PATENT DOCUMENTS

| | | | | |
|---|---|---|---|---|
| 5,345,483 | A * | 9/1994 | Johansson et al. | 376/313 |
| 5,390,221 | A * | 2/1995 | Dix et al. | 376/352 |
| 5,490,189 | A * | 2/1996 | Schechter | 376/313 |
| 5,528,640 | A * | 6/1996 | Johansson et al. | 376/313 |
| 6,847,695 | B2 * | 1/2005 | Kageyama et al. | 376/310 |
| 7,149,272 | B2 * | 12/2006 | Soderlund et al. | 376/310 |
| 2004/0071255 | A1 | 4/2004 | Nylund | |

FOREIGN PATENT DOCUMENTS

| | | | |
|---|---|---|---|
| EP | 0432738 | A1 | 6/1991 |
| JP | 56117194 | * | 9/1981 |
| JP | 56117194 | A | 9/1981 |
| JP | 5072376 | A | 3/1993 |
| JP | 7151882 | A | 6/1995 |
| JP | 2006201107 | A | 8/2006 |
| WO | 02075746 | A1 | 9/2002 |

* cited by examiner

FIG. 1
FIG. 2
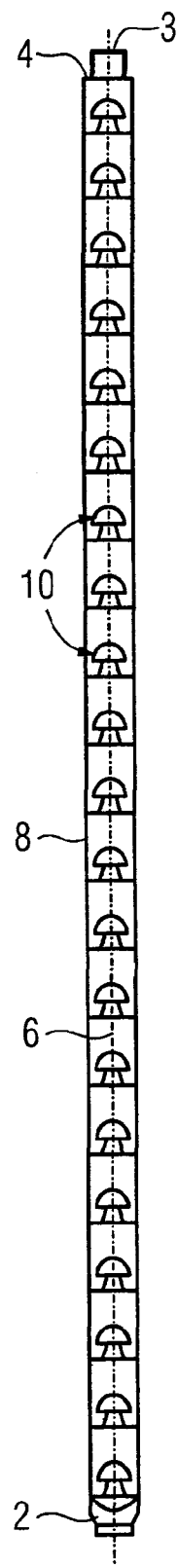
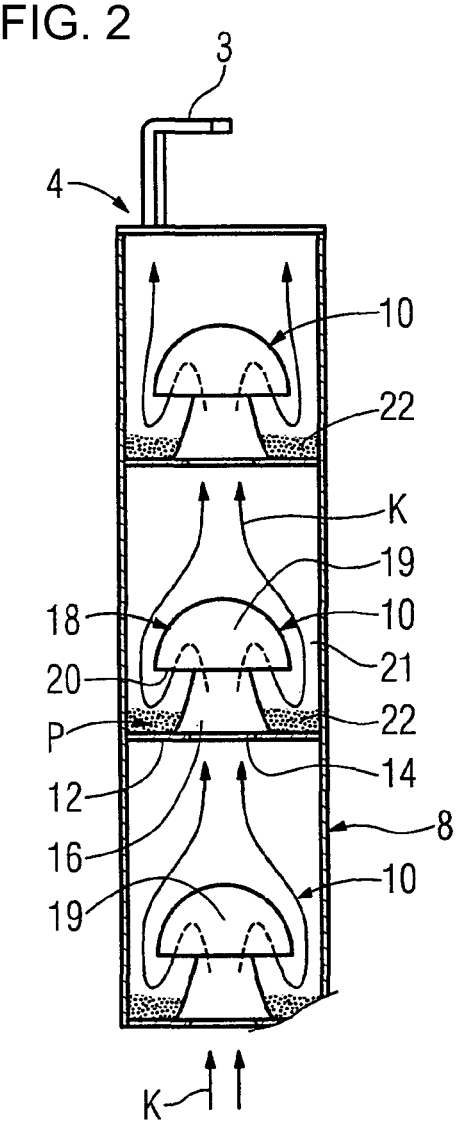

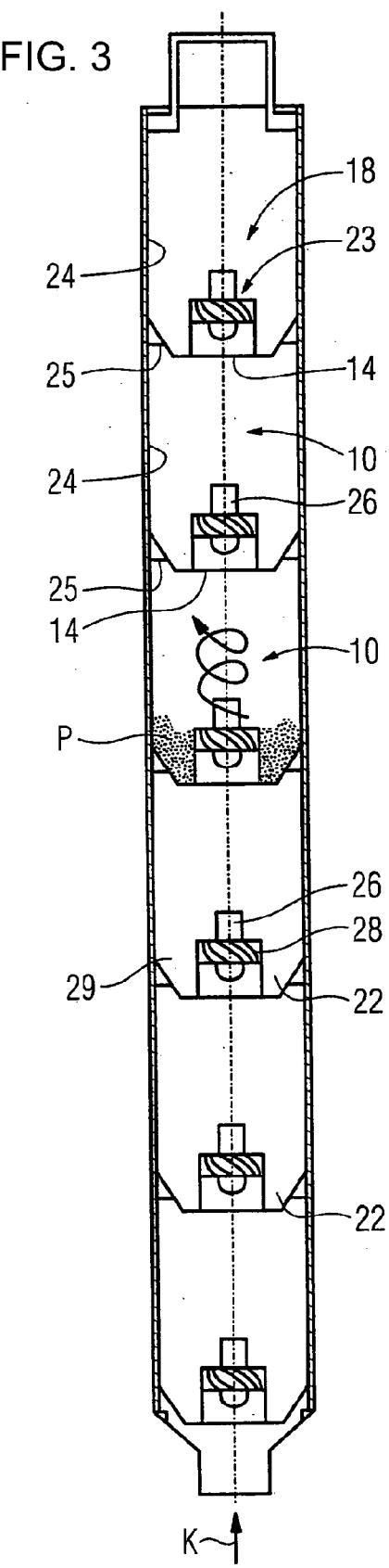
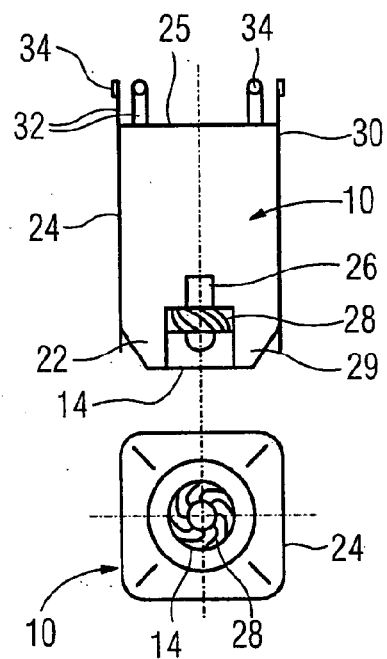

DEVICE FOR REMOVING SOLID PARTICLES FROM THE COOLING MEDIUM WHICH CIRCULATES IN THE PRIMARY CIRCUIT OF A NUCLEAR REACTOR

CROSS-REFERENCE TO RELATED APPLICATIONS

This is a continuation, under 35 U.S.C. §120, of copending international application PCT/EP2007/006317, filed Jul. 17, 2007, which designated the United States; this application also claims the priority, under 35 U.S.C. §119, of German patent applications DE 10 2006 034 001.9, filed Jul. 22, 2006 and DE 10 2006 038 748.1, filed Aug. 17, 2006; the prior applications are herewith incorporated by reference in their entirety.

BACKGROUND OF THE INVENTION

Field of the Invention

The invention relates to a device for removing solid particles from the cooling medium which circulates in the primary circuit of a nuclear reactor, especially in the primary circuit of a boiling-water nuclear reactor. The invention additionally relates to a reactor core of a nuclear reactor having such a device.

It may be the case, due to servicing works in the primary circuit of a nuclear reactor, that foreign bodies in the form of small solid particles may get into the primary circuit and are constantly circulated with the cooling medium. These solid particles deposit in dead zones of the flow and in gaps and can, in the case of disassembly processes within the framework of maintenance works, result in jamming or heaviness in moving the components to be disassembled. Furthermore, these solid particles can lead to increased erosion in narrow gaps through which the cooling medium flows.

It is known from European patent EP 0 432 738 B1 and U.S. Pat. No. 5,219,517 for avoiding erosion or abrasion damage caused by foreign bodies, in fuel rods of a fuel assembly for a pressurized-water reactor to arrange a dirt trap in the form of a strainer screen or of a funnel-shaped strainer below the base plate of the fuel assembly. The dirt trap prevents foreign particles from penetrating the fuel assembly. In the embodiment with the funnel-shaped strainer having a free passage in the center, guide vanes are connected upstream of it, which guide vanes produce a circular flow and prevent foreign particles from flowing into the central free passage.

Although such a strainer screen or such a funnel-shaped strainer makes it possible to prevent foreign particles from penetrating into the interstices between the fuel rods, it is a problem that a dirt trap of this kind can partially clog and adversely affect the flow conditions in the fuel assembly. In order to avoid problems relating to foreign particles from the outset, the aim is in principle to clean the cooling medium in filter installations in order to reduce in this way the amount of such foreign substance particles, which are entrained in the cooling medium, from the outset.

It has been found here that the filter installations which are usually present in nuclear power stations for cleaning the cooling medium do not suffice for removing these solid particles from the cooling medium circuit, since it could be observed that solid particles would collect again at the previously mentioned locations even after such a cleaning process has been carried out.

SUMMARY OF THE INVENTION

It is accordingly an object of the invention to provide a device for removing solid particles which overcomes the above-mentioned disadvantages of the heretofore-known devices and methods of this general type and which specifies a device which can be used to reliably remove solid particles from the cooling medium which is circulated in the primary circuit of a nuclear reactor, especially of a boiling-water nuclear reactor, in a simple manner.

With the foregoing and other objects in view there is provided, in accordance with the invention, a device for removing solid particles from a cooling medium circulating in a primary circuit of a nuclear reactor, wherein the nuclear reactor has a reactor core with defined fuel assembly positions for the placement of fuel assemblies, the device according to the invention having geometric dimensions and shapes configured for insertion thereof into an empty fuel assembly position in the reactor core of the nuclear reactor, like a fuel assembly that is configured for said nuclear reactor and instead of such a fuel assembly.

In other words, the geometric dimensions and shapes of the device are such that the latter can be inserted into an empty fuel assembly position in the reactor core of the nuclear reactor like a fuel assembly which is configured for said nuclear reactor and instead of such a fuel assembly. This measure provides a filter or cleaning device which is active during the entire duration of normal operation of the nuclear reactor and eliminates the solid particles from the circulated cooling medium successively and effectively on account of the long period of use, i.e. separates them from the cooling medium flow, due to said solid particles depositing inside the device during operation of the nuclear power station. The device can then be removed from the reactor core and cleaned like a fuel assembly within the framework of usual servicing and maintenance works, for example at the end of an operating cycle. Once the solid particles deposited therein have been removed, the device can once again be inserted at the same or another empty fuel assembly position in order to begin operation again after the start-up of the nuclear reactor. Alternatively, it is also possible to dispose of the entire device like a burnt out fuel assembly, for example after use for a number of operating cycles.

In a device which is especially suited for use in a boiling-water nuclear reactor, the device comprises a carrying structure which extends in a longitudinal direction and in which at least one separator is arranged, but preferably a plurality of separators which are arranged one after another in the longitudinal direction.

In particular flow separators are here provided as the separator, in which cooling medium and solid particles are separated due to the action of gravity or a centrifugal force. The use of a flow separator enables structural designs which have a low flow resistance with sufficient separation action.

The carrying structure is in particular a hollow case. Such a device is suitable especially for use in a boiling-water reactor.

In a particularly preferred embodiment of the invention, an insert which can be inserted into the carrying structure and is provided with an inlet opening for the cooling medium is provided as the separator and has, opposite and at a spacing from said inlet opening, a deflection device for deflecting the cooling medium, and is provided with an accumulation zone for collecting the solid particles which are separated during deflection due to the centrifugal force. Such a separator has a simple design and can be produced with little technical complexity and can be matched flexibly to the respective requirements which are specific to the power station.

If a cyclone, especially in the form of a fixed guide vane, is provided as the deflection device, which cyclone imparts on the cooling medium, which flows in the longitudinal direction inside the carrying structure, a circular motion about said longitudinal direction, a high degree of separation is achieved with low flow resistance and low tendency to flow-induced vibrations.

In another preferred embodiment, a plurality of separators are arranged in the longitudinal direction one after the other and releasably connected to one another. A stack which is formed in this manner can be installed in, or removed from, the carrying structure particularly simply in its entirety.

If a plurality of separators are arranged one after the other in the longitudinal direction and have different designs from one another in order to achieve a different separation effect, solid particles which differ physically and in terms of their geometry from one another can be deposited from the cooling medium with a high degree of efficiency in a single device.

If the flow resistance of the device corresponds at least approximately to the flow resistance of a fuel assembly, the hydraulic conditions in the area surrounding the device are at most influenced to an acceptable degree, compared to operation with an inserted fuel assembly.

In a reactor core of a nuclear reactor, in which a device according to the invention is inserted in an empty fuel assembly position, the device is preferably located at the edge, especially in a corner position, since the fuel assemblies which are located in these positions have the lowest output to the core and thus the overall output of the core is reduced as little as possible if such a fuel assembly is replaced by the device according to the invention.

Other features which are considered as characteristic for the invention are set forth in the appended claims.

Although the invention is illustrated and described herein as embodied in device for removing solid particles from the cooling medium which circulates in the primary circuit of a nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 shows a device according to the invention in a schematic view of its longitudinal side with a plurality of separators which are arranged one after another;

FIG. 2 shows an enlarged schematic representation of the device in one of its end regions;

FIG. 3 shows an alternative embodiment of the invention with separators in the form of a cyclone;

FIG. 4A shows a separator in the unmounted state in a side view;

FIG. 4B is a plan view from below, in the flow direction, of the separator;

DETAILED DESCRIPTION OF THE INVENTION

Figure 5:
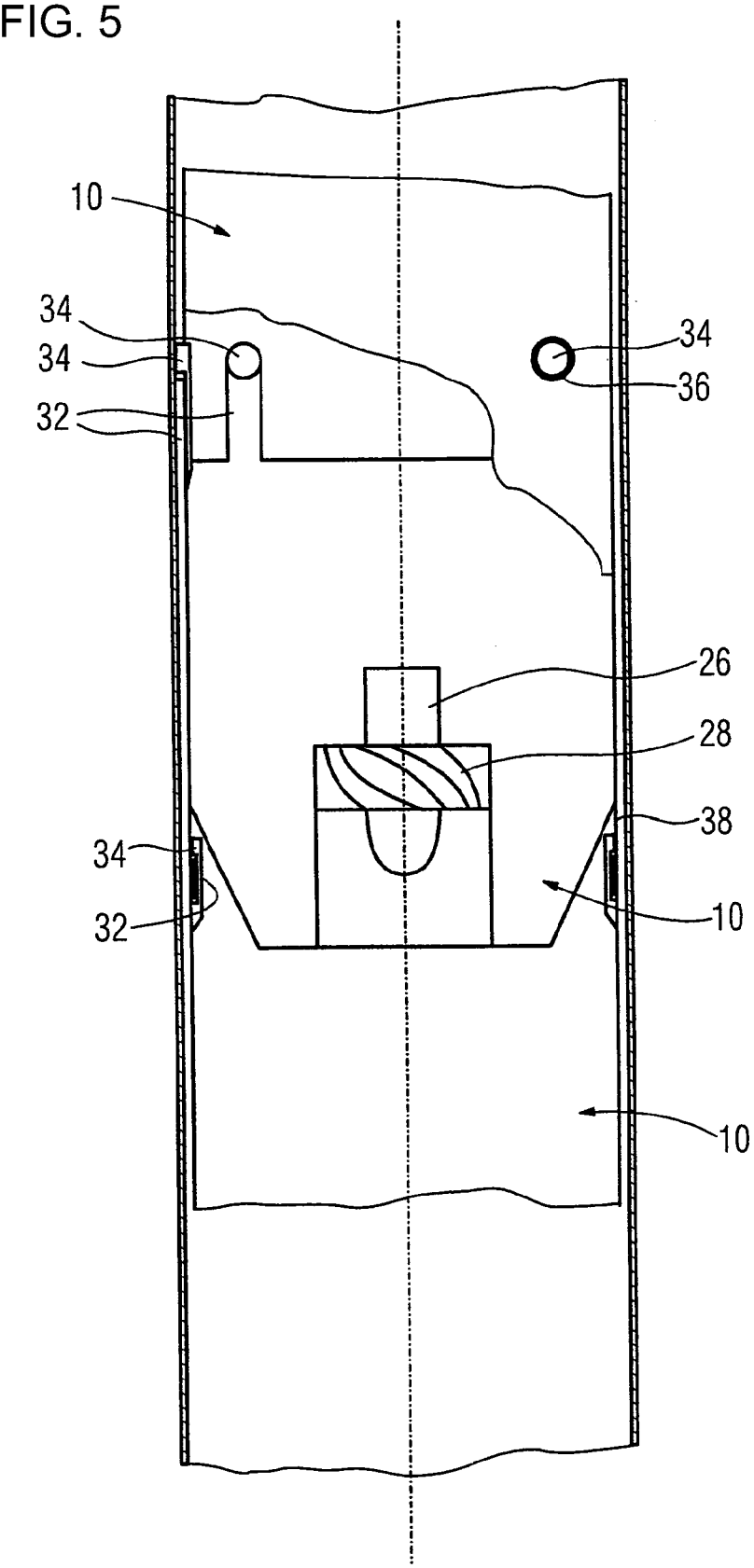
FIG. 5 shows an enlarged partial representation of the device shown in FIG. 3.

Referring now to the figures of the drawing in detail and first, particularly, to FIG. 1 thereof, there is shown a device to be inserted in the reactor core of a boiling-water reactor. The device includes, according to the invention, a base part 2 and a top part 4, which is provided with a handle 3 and the dimension and shape of which are such that the device can be inserted like a fuel assembly, which is configured for this nuclear reactor, between a top core grid and a bottom core grid instead of such a fuel assembly in an empty fuel assembly position in the reactor core. Base part 2 and top support 4 are connected to one another by a carrying structure 8 which extends in a longitudinal direction 6, in the example a case, which has the external dimensions of the case of a fuel assembly which is configured for said boiling-water reactor. A large number of separators 10 are arranged inside the case (carrying structure 8), one after the other in the longitudinal direction 6, such that the cooling medium, which flows through the inside of the carrying structure 8, in the example through the case, flows through them successively.

FIG. 2 shows the upper end of the device, which faces the top part 4 with the handle 3, in an enlarged representation. The separators 10 are in the form of an insert which is inserted in the case (carrying structure 8) and comprise in the exemplary embodiment a carrying plate 12 having an inlet opening 14 in its center, which inlet opening 14 conducts the cooling medium K flowing in the case into a flow passage 16, the cross section of which tapers in the direction of flow in the form of a nozzle. At the outlet of the flow passage 16, there is a deflection device 18 which is used to deflect the cooling medium K. In this exemplary embodiment, the deflection device 18 is formed by a spherical cap 19 which deflects the incident cooling medium flow by nearly 180°. An outlet opening 20 in the form of a circular ring is formed between the spherical cap 19 and the wall of the case, from which outlet opening 20 the cooling medium K exits, such that it flows outside the flow passage 16 along its outer wall in the direction of the carrying plate 12 which, together with the inner wall of the case, effects another deflection of the cooling medium K by likewise nearly 180°, such that the latter can flow upward (axially in the direction twoards the top part 4) through an outlet passage 21, which is formed between the wall of the case and deflection device 18, to the next separator 10. The edge region of the accumulation plate 12 forms a dead space 22 and thus an accumulation zone for solid particles P which deposit there on account of the centrifugal force which is effected by the lower deflection of the cooling medium K.

In the exemplary embodiment according to FIG. 3, cyclones 23 are provided as the deflection devices 18 in the separators 10. In this exemplary embodiment, the separators 10 are also in the form of individual modules or inserts which can be inserted in the case (the carrying structure 8). Each separator 10 has a rectangular hollow section 24 which is provided at one of its end faces with the inlet opening 14 and is open at the opposite end face 25. A short flow passage 16 is also connected to the inlet opening 14. The cyclone 23, which comprises a fixed accumulation body 26 having a plurality of vanes or guide vanes 28, is arranged at the outlet, which merges into the hollow section 24, of the centrally arranged flow passage 16, i.e. the flow passage 16 which after installation into the carrying structure is aligned with the longitudinal direction 6. The guide vanes 28 are likewise positionally fixed to the accumulation body 26 and impart on the cooling medium K, which flows in the longitudinal direction 6, a circular motion about said longitudinal direction 6 (angular momentum parallel to said longitudinal direction 6) and thus produce a motion of the cooling medium K along a helical path about said longitudinal direction 6. This circular movement causes a force which is directed outwardly (centrifugal force) to be exerted onto the solid particles 22 which flow out of the flow passage 16, which force transports the particles outwardly in the direction of the inner wall of the hollow section 24 into zones which are calm in terms of flow, where they sink, due to the action of gravity, into a dead space 22 which surrounds the flow passage 16 and at the same time serves as the collection space.

FIGS. 4A and 4B show that the hollow section 24, which is open at the top (in the installed state during operation), has at its (upper) edge 30 which is located at the end face opposite the inlet opening 14 a plurality of resilient tongues 32 which extend in the longitudinal direction 6 and have arranged at their free ends nubs 34 which project radially outward.

In FIG. 5, the nubs 34 engage in openings 36 of the adjacent separator 10, which is located above it and rests on the upper edge 30, and form a snap-action or latching connection such that the separators 10, which are arranged in the form of a stack, are interconnected with a positive fit and can be lifted out of the carrying structure 8 together as the stack. The snap-action connection can also be unlocked using a tool in order to be able to remove the inserts individually as well.

In the region of the inlet opening 14, the hollow section 24 is shaped similarly to a truncated pyramid, such that it projects into the separator 10 with its inlet opening 14 if it rests with a circumferential collar 38 (see also FIGS. 4A and 4B), which is located on the base of the truncated pyramid, on the upper edge of the hollow section 24 of said separator 10 which is located underneath it (in the installed state).

In the exemplary embodiments shown in FIGS. 1-5, the separators are in the form of flow separators having a deflection device which effect a change in the flow direction of the cooling medium—a deflection—and in which the solid particles are driven into zones which are calm in terms of flow due to the centrifugal forces which act on them, where they are no longer entrained by the cooling medium and collect in the dead zones which are provided as accumulation space.

Figure 6:
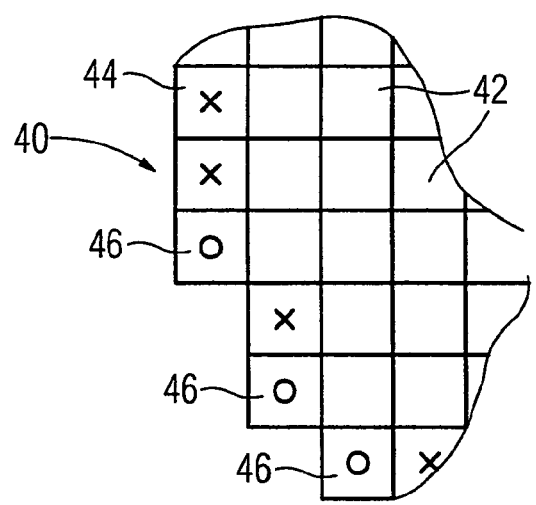
FIG. 6 shows a detail of the grid structure of a reactor core in its edge region with preferred positions for inserting the device according to the invention.

FIG. 6 shows a detail from the edge region of a reactor core 40, whose cells 42 are in each case occupied by a fuel assembly. In the figure, "x" and "o" now identify fuel assembly positions 44, 46 at the edge of the reactor core which are particularly suitable for insertion of a device according to the invention. These are preferably corner positions 46 where only two side edges of the device adjoin an adjacent fuel assembly. A reactor core 40 which is fitted in this manner with one or more such devices ensures a reliable and continuous removal of solid particles from the primary circuit.

The invention claimed is:

1. An assembly in a primary circuit of a nuclear reactor, wherein the nuclear reactor has a reactor core with defined fuel assembly positions for a placement of fuel assemblies, the assembly comprising:
a device for removing solid particles from a cooling medium circulating in the primary circuit, said device not being a fuel assembly, but said device having a device outline with geometric dimensions and shapes configured for insertion thereof into an empty fuel assembly position in the reactor core of the nuclear reactor instead of a fuel assembly;
a carrying structure extending in a longitudinal direction and at least one separator disposed in said carrying structure, said at least one separator being a flow separator, said flow separator having a deflection device configured for imparting centrifugal forces onto the solid particles and driving the solid particles into calm zones of said flow separator provided as accumulation spaces.

2. The assembly according to claim 1, wherein said at least one separator is one of a plurality of separators disposed one after another in the longitudinal direction in said carrying structure.

3. The assembly according to claim 2, wherein said separators are releasably connected to one another.

4. The assembly according to claim 1, wherein said carrying structure is a hollow case.

5. The assembly according to claim 1, wherein said at least one separator is an insert configured for insertion into said carrying structure, said insert is formed with an inlet opening for the cooling medium, and has, opposite and at a spacing distance from said inlet opening, a deflection device for deflecting the cooling medium, and is formed with an accumulation zone for collecting the solid particles that are separated during deflection due to a centrifugal force.

6. The assembly according to claim 5, wherein said deflection device is a cyclone disposed to impart on the cooling medium, which flows in the longitudinal direction inside said carrying structure, a circular motion about the longitudinal direction.

7. The assembly according to claim 6, wherein said deflection device includes at least one fixed guide vane.

8. The assembly according to claim 1, wherein said separator is one of a plurality of separators disposed one after another in the longitudinal direction and having mutually different designs from one another in order to achieve a different separation effect.

9. The assembly according to claim 1, configured to have a flow resistance substantially corresponding to a flow resistance of a fuel assembly.

10. The assembly according to claim 1, configured for insertion into the reactor core of a boiling-water nuclear reactor.

11. A reactor core of a nuclear reactor, comprising an assembly according to claim 1 inserted into an empty fuel assembly position.

12. The reactor core according to claim 11, configured as a core of a boiling-water reactor.

13. The reactor core according to claim 11, wherein said device is inserted in a fuel assembly position is located at an edge of a fuel assembly grid.

14. The reactor core according to claim 11, wherein said device is inserted in a corner position of a fuel assembly grid.

* * * * *